No. 609,433. Patented Aug. 23, 1898.
T. A. HEARSON.
FASTENING FOR CRANKS.
(Application filed Dec. 31, 1897.)
(No Model.)
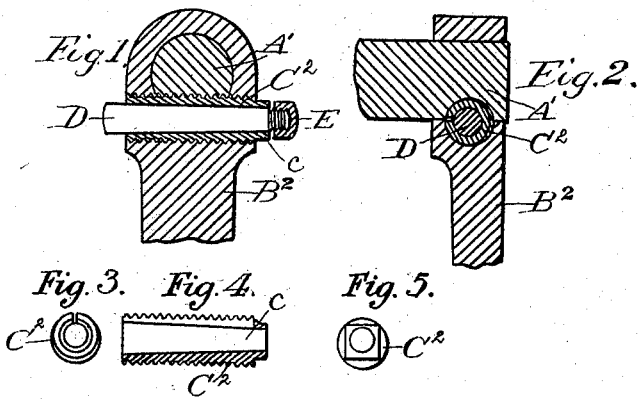

UNITED STATES PATENT OFFICE.

THOMAS ALFRED HEARSON, OF LONDON, ENGLAND.

FASTENING FOR CRANKS.

SPECIFICATION forming part of Letters Patent No. 609,433, dated August 23, 1898.

Application filed December 31, 1897. Serial No. 665,124. (No model.)

*To all whom it may concern:*

Be it known that I, THOMAS ALFRED HEARSON, professor of engineering, a subject of the Queen of Great Britain, residing at Cooper's Hill, Englefield Green, London, in the county of Surrey, England, have invented certain new and useful Improvements in Fastenings for Attachments to Shafts, &c., of which the following is a specification.

For the purpose of securing together a shaft and a crank or other attachment which is mounted on it I drill a hole through the attachment in a direction at right angles or approximately at right angles to the axis of the shaft at such a distance from the axis that (the shaft being in place) the drill will remove a portion of the material of the shaft. On the surface of the hole I cut a screw-thread, a portion of the screw-thread being formed in the material of the shaft, and into this hole I insert a hollow screw-plug. On one end of the screw-plug I form a head or flat to facilitate tight insertion and removal. The bore of the hollow plug is tapered, and I cut along the whole or a portion of the length of the plug a slot to make the plug capable of expansion. A tapered pin is employed, which on being inserted expands the plug and sets it tightly in place. On driving the pin in the opposite direction the plug will be slackened and may be easily unscrewed.

In the accompanying drawings, Figure 1 is a transverse section of my improved fastening. Fig. 2 shows a section at right angles to the section shown in Fig. 1. Figs. 3, 4, and 5 are end views and a longitudinal section of the screw-plug employed.

The device which I employ may be used for fastening crank-arms to axles, sleeves to shafts, and, in fact, various attachments to shafts and axles. I have shown my improvements applied for the purpose of fastening together a shaft $A'$ and a crank-arm $B^2$.

The screw-plug $C^2$ is made hollow by forming a tapered hole in it. The hollow plug is shown separately in Figs. 3, 4, and 5. A slit is cut on one side, which extends as far as the end $c$ of the screw; but the slit does not extend through the end $c$. When in place, the slit is turned into the position shown in Fig. 2 or into a position which would be arrived at by turning the plug through a half-revolution. A tapered pin D is fitted into the taper hole, and when it is driven in tightly by a hammer the screw-plug will be pressed very closely against the axle $A'$. When it is required to disconnect the tapered pin, it is first driven back, and the screw-plug will then be slackened and may be readily unscrewed. A nut E is screwed onto the small end of the pin D for the purpose, first, of preventing it from falling out of place and being lost if it should become loose, and, secondly, to protect the point of the pin from being injured when by means of a hammer it is driven out of the taper hole.

I claim as my invention—

The combination of a shaft and an attachment to be secured thereto, and a hollow screw-threaded split plug fitting a screw-threaded hole and arranged at approximately right angles to the axis of the shaft and extending into both the shaft and the attachment, and a tapered pin arranged in the bore of a hollow plug.

THOMAS ALFRED HEARSON.

Witnesses:
FRED C. HARRIS,
ROBERT B. RANSFORD.